United States Patent [19]

Fitzpatrick et al.

[11] Patent Number: 5,088,322
[45] Date of Patent: Feb. 18, 1992

[54] EXTENDED RANGE FLOW METER

[75] Inventors: James Fitzpatrick, Dubois; Fred K. Enseki, Reynoldsville, both of Pa.

[73] Assignee: Equimeter, Inc., Dubois, Pa.

[21] Appl. No.: 530,100

[22] Filed: May 29, 1990

[51] Int. Cl.5 .................................................. G01F 7/00
[52] U.S. Cl. ........................................................ 73/197
[58] Field of Search .................................... 73/195, 197

[56] References Cited

U.S. PATENT DOCUMENTS 3,803,912  4/1974  Ohno ...................................... 73/195
4,653,321  3/1987  Cunningham et al. ................ 73/197

Primary Examiner—Herbert Goldstein
Attorney, Agent, or Firm—Lorusso & Loud

[57] ABSTRACT

This invention concerns an extended range flow meter and method of providing continuous metering of fluid flow utilizing of two or more flow meters by the more accurate flow meter or combination of flow meters at a given flow volume.

25 Claims, 4 Drawing Sheets

EXTENDED RANGE FLOW METER

FIELD OF THE INVENTION

This invention concerns a self regulating extended range flow meter comprising:

(a) a meter inlet for receiving a main flow said inlet being divided into (b) a higher volume line and a lower volume line the lower volume line being smaller than the main; and the higher volume line containing therein (c) a line specific flow meter; and, the lower volume line containing therein (d) a line specific flow meter and further the lower volume line having (e) a flow rate monitor in readable connection with a differential pressure controller means said pressure controller means having (f) a senior controller aspect maintaining on/off control of higher volume line flow through a senior control valve located in the higher volume line, and (g) a junior controller aspect maintaining proportional control of higher and lower volume line flow through a junior control valve located in the higher volume line at a bypass point down stream of the higher volume line specific flow meter and up stream of the senior control valve;

(h) wherein said junior and senior controller aspects are designed and configured for meter-adaptive flow balance; as well as a method of such regulation.

BACKGROUND OF THE INVENTION

Accurate and efficient flow metering as to the volume of fluid (e.g., liquid, gas or supercritical fluid) is of widespread industrial concern. Chemical processing requires elaborate, continuous and timely monitoring of fluids passing through lines to reactors or to shipment. Industry is best served by a unitary meter that has a capacity to monitor flow rates from the lowest to the highest anticipated flow demands. Realizing this end has been hampered by the finite flow rate limitations of each of the various meter types now in use. Diaphragm meters are accurate at flow rates from about 0 to about $10^4$ cfh, but generally capacity limited as to substantially greater flows. Clearly the maximum flow rate for a diaphragm meter may be well below industrial demands for a particular system. Turbine meters, on the other hand, have considerably higher capacities, but have inherent limited flow measurement capability. Other types of flow meters are well known to those skilled in the art.

The instant invention provides a unitary meter providing for accurate extended range metering over an extended range of flows that previously could not be metered by a unitary device. Also disclosed is a novel process of accomplishing such extended range metering.

SUMMARY OF THE INVENTION

This invention includes an extended range flow meter comprising:

(a) a meter inlet for receiving a main flow said inlet being divided into (b) a higher volume line and a lower volume line the lower volume line being smaller than the main flow; and the higher volume line containing therein (c) a line specific flow meter; and, the lower volume line (d) a line specific flow meter and further the lower volume line having (e) a flow rate monitor in readable connection with a differential pressure controller means said pressure controller means having (f) a senior controller aspect maintaining on/off control of higher volume line flow through a senior control valve located in the higher volume line, and (g) a junior controller aspect maintaining proportional control of higher and lower volume line flow through a junior control valve located in the higher volume line at a bypass point, and said point comprising a bypass line, down stream of the higher volume line specific flow meter and up stream of the senior control valve;

(h) wherein said junior and senior controller aspects are designed and configured for meter-adaptive flow balance; optionally wherein the controller means is pneumatic, hydraulic, electronic or mechanical.

In one embodiment the meter adaptive flow balance design and configuration (h) further comprises:

means for control of higher volume line flow through the bypass line such that flow rate in the bypass line when the senior control valve is opened $(Q)_c$ is equal to or greater than the minimum accuracy limit for the higher volume line specific meter. In a particular application the flow rate monitor is an orifice meter.

The invention further includes the extended flow range meter further comprising a bypass line control valve located at the bypass point within the bypass line. said bypass line exiting the higher volume line up stream of the junior control valve and reentering the higher volume line down stream of the junior control valve and up stream of the senior control valve.

In particular applications utilizing pneumatic controller means the meter adaptive flow balance design and configuration (h) further comprises:

means for control of higher volume line flow through the bypass line such that flow rate in the bypass line when the senior control valve is opened $(Q)_c$ is equal to or greater than the minimum accuracy limit for the higher volume line specific meter, and optionally means for closing the junior control valve upon opening of the senior control valve maintaining lower volume line flow rate at or below a maximum flow rate in the lower volume line $(Q_M)$, and further comprising a bypass line control valve located at the bypass point within the bypass line.

This invention also comprises an extended range flow meter comprising:

(a) a meter inlet for receiving a main flow said inlet being divided into:

(b) a highest volume line and one or more sequentially lower volume lines and a least volume line the sequentially lower volume lines and the least volume line each smaller than the main flow; and each of the highest volume line, the sequentially lower volume lines and the lowest volume line containing therein (c) a line specific flow meter; and further, the sequentially lower volume lines and lowest volume line each having (d) a flow rate monitor in readable connection with a differential pressure controller means said differential pressure controller means being (e) a senior controller aspect maintaining sequential on/off control of line flow through sequential senior control valves located in the higher volume line and each lower volume line, and (f) sequentially junior controller aspects maintaining proportional control of highest and sequentially lower volume and lowest volume line flow through junior control valves located in the higher volume line and each sequentially lower volume line as to each such line at a bypass point down stream of each line specific flow meter and up stream of each senior control valve;

(g) wherein said junior and senior controller aspects are designed and configured for meter-adaptive flow balance. An Aspect of this invention includes a method of extended range flow metering comprising the step of meter-adaptive flow balancing of fluid flow through an apparatus comprising:

(a) a meter inlet for receiving a main flow said inlet being divided into (b) a higher volume line and a lower volume line the lower volume line being smaller than the main flow; and the higher volume line containing therein (c) a line specific flow meter; and, the lower volume line containing therein (d) a line specific flow meter and further the lower volume line having (e) a flow rate monitor in readable connection with a differential pressure controller means said pressure controller means having (f) a senior controller aspect maintaining on/off control of higher volume line flow through a senior control valve located in the higher volume line, and (g) a junior controller aspect maintaining proportional control of higher and lower volume line flow through a junior control valve located in the higher volume line at a bypass point, and said point comprising a bypass line, down stream of the higher volume line specific flow meter and up stream of the senior control valve; optionally wherein the flow rate monitor is an orifice meter; and further wherein the controller means is pneumatic, hydraulic, electronic or mechanical.

An embodiment of the method includes the meter adaptive flow balance design and configuration further comprising:

means for control of higher volume line flow through the bypass line such that flow rate in the bypass line when the senior control valve is opened $(Q)_c$ is equal to or greater than the minimum accuracy limit for the higher volume line specific meter.

Optionally, the method includes practicing the method by use of the noted apparatus having a bypass line control valve located at the bypass point within the bypass line. said bypass line exiting the higher volume line up stream of the junior control valve and reentering the higher volume line down stream of the junior control valve and up stream of the senior control valve.

Further contemplated is the method wherein the meter adaptive flow balance design and configuration (h) further comprises:

means for control of higher volume line flow through the bypass line such that flow rate in the bypass line when the senior control valve is opened $(Q_c')$ is equal to or greater than the minimum accuracy limit for the higher volume line specific meter or optionally means for closing the junior control valve upon opening of the senior control valve maintaining lower volume line flow rate at or below a maximum flow rate in the lower volume line $(Q_m)$, such as wherein the flow rate monitor is an orifice meter, and wherein the apparatus comprises a bypass line control valve located at the bypass point within the bypass line.

Yet a further aspect of the invention includes a method of extended range flow metering comprising the step of meter-adaptive flow balancing of fluid flow through an apparatus comprising:

(a) a meter inlet for receiving a main flow said inlet being divided into:

(b) a highest volume line and one or more sequentially lower volume lines and a least volume line the sequentially lower volume lines and the least volume line each smaller than the main flow; and each of the highest volume line, the sequentially lower volume lines and the lowest volume line containing therein (c) a line specific flow meter; and further, the sequentially lower volume lines and lowest volume line each having (d) a flow rate monitor in readable connection with a differential pressure controller means said differential pressure controller means being (e) a senior controller aspect maintaining sequential on/off control of line flow through sequential senior control valves located in the higher volume line and each lower volume line, and (f) sequentially junior controller aspects maintaining proportional control of highest and sequentially lower volume and lowest volume line flow through junior control valves located in the higher volume line and each sequentially lower volume line as to each such line at a bypass point down stream of each line specific flow meter and up stream of each senior control valve;

(g) wherein said junior and senior controller aspects are designed and configured for meter-adaptive flow balance.

DETAILED DESCRIPTION OF THE INVENTION

The instant invention apparatus and method are better understood with reference to the following definitions.

"Extended range" as used herein shall mean continuous (as to flow) volumetric metering of fluid flow utilizing two or more flow meters by the more accurate flow meter or combination of flow meters at a given flow volume.

A basic embodiment of this invention is the extended range metering of fluid flow of from about zero (i.e., such as about 1 cfh (cubic feet per hour)) to about the maximum capacity of a turbine type meter which is up to about 140,000 cfh. This extended range contemplates the use of diaphragm type flow meters most useful in the 1 cfh to 10,000 cfh ranges as used in conjunction with turbine type flow meters.

"Accurate" as describing the meter readings over an entire flow range means substantially within about ±1%.

"Proportional control" as referring to the control exerted by the junior controller aspect through the junior control valve shall mean the potential to block passage of fluid flowing through the higher volume or sequentially lower volume lines at the bypass point in a continuum up to substantially total blockage of any or all of the highest or sequentially lower volume lines at the bypass point—substantially closed. The foregoing function does not act so as to block line flow in a bypass line.

"Substantially closed" as to a junior control valve shall mean at least about a 99% stoppage of fluid flow through the line so served (discounting flow through a bypass line).

"Higher volume" and "lower volume" as to flow lines of the disclosed invention are simple relative terms expressing the comparative flow volumes through alternative flow lines. By the apparatus and method disclosed herein high accuracy of flow volume readings is obtained by causing fluid flow to be presented to line specific flow meters in each line at flow rates optimal to each meters capacity as to volume and accuracy. In one embodiment a diaphragm flow meter is used for the lower flow volume measurement and a turbine meter is used for the higher flow volume measurement. Other meters, however, are well known in the art and fully contemplated herein.

Additionally, in a particular embodiment requiring high accuracy within a limited flow range, two or more of the line specific flow meters are of the same type (such as the diaphragm type). The flow meters, even though of the same type, are sized and configured for highest accuracy over specific subranges contemplated as to the flow line in which the flow meter is located, yet each within the general capacity of the basic flow meter type. Selection of a particular component flow meter is made based upon the type of fluid such as gas or liquid and anticipated flow volume as well as the physical characteristics of the fluid (e.g., viscosity, operating temperature, inter alia).

"Meter-adaptive flow balancing" shall mean the feedback cycling of the inventive meter permitting the switching from lower (or lowest) volume line metering to include the higher (or highest) volume line metering.

"Readable connection" as to an flow rate monitor such as the orifice meter or pressure coupling connected to a controller shall mean that a controller so connected registers an indication of flow rate such as the pressure differential in the line serving the flow rate monitor. In an embodiment employing an orifice monitor connected to a pneumatic controller means, tubes containing the fluid being measured run to the actual controller means and are conveniently read as the pressure drop as to flow passing through the meter orifice compared to the pressure up-stream of the orifice by methods well known to those skilled in the art. Orifice type meters are particularly useful in the practice of the instant invention. The parameter "reported" by an orifice meter is pressure drop exhibited by fluid passing through a constriction in a fluid line comparing pressure up stream of the orifice to pressure down stream of the orifice. Such a differential reading is useful in determining meter-adaptive flow balancing.

"Sequentially lower volume line(s)" is understood to be the arrangement of one or more flow lines of lesser flow than the highest flow line and greater flow than the lowest flow line, and —in the case of two or more such sequential lower volume lines —sequential in order of metering bias. The determinant of flow sequence as to highest/higher, lower, and lowest is understood not to be based on the cross section or other flow properties of the individual piping comprising the lines but on the metering capacity/range of the line specific flow meter. In a common embodiment this will coincide with the system bias diverting flow to flow lines by the differential pressure controller means of the instant invention relative to the metering capacity of each line.

Each line of the disclosed meter has entrained therein a flow meter to determine the total flow as to the specific line—line specific flow meter. It is to be understood that such meter readings could, however, be summed or otherwise utilized with out specific attribution to each line. The highest volume line has entrained therein the flow meter of highest capacity and the various sequentially lower volume lines entrain lower capacity flow meters, generally in descending order, and the lowest volume line has a lowest capacity flow meter. In practice the actual line volumes may be of varying (or equal) capacities. The term "flow rate monitor" distinguishes the monitoring function resulting in the biasing of flow to higher/lower and lowest volume lines from the summing (or other computational) function of the extended range meter itself. The component parts comprising monitors and meters are potentially of the same or similar types in particular embodiments. The invention will be better understood with reference to the drawings.

Figure 1:
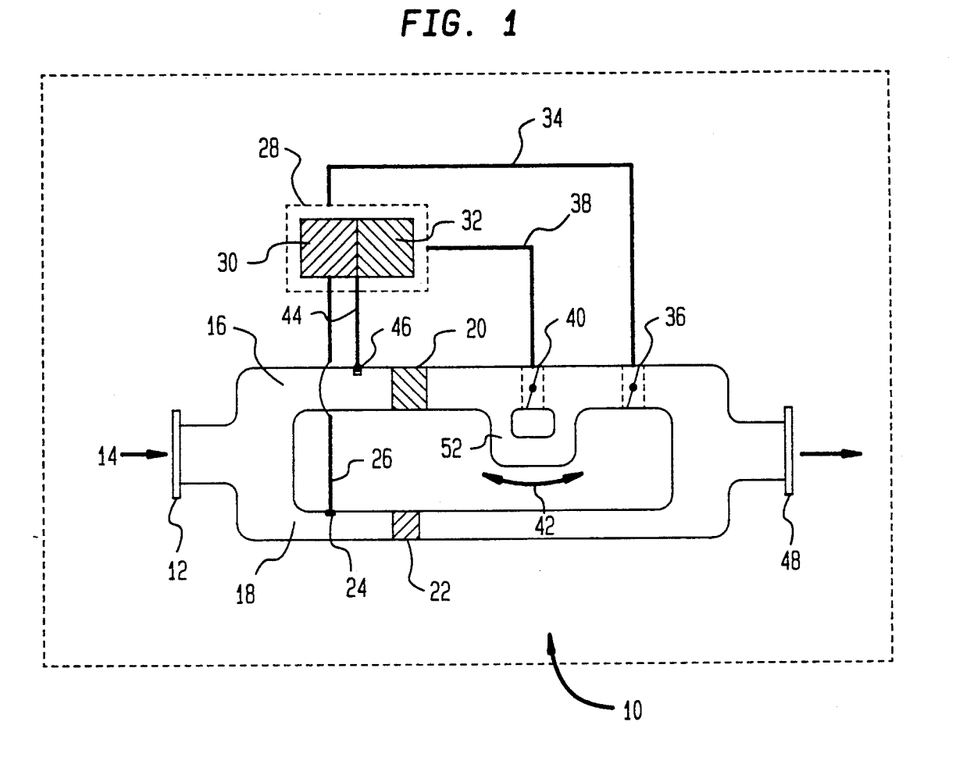
FIG. 1 is a schematic diagram of an extended range flow meter.

FIG. 1 shows an extended range flow meter (10) a meter inlet (12) for receiving a main flow (14). From the meter inlet is a higher volume line (16) and a lower volume line (18). As depicted the lower volume line is of lesser capacity than the main flow from which it receives fluid. The higher volume line has a line specific flow meter (20). Similarly, the lower volume line has a line specific flow meter (22) and also a flow rate monitor (24) in readable connection via sensor line (26) With a differential pressure controller means (28). In tho most general case, it is possible for the readings of flow rate monitor to arise from flow meter (22) rather than from separately depicted flow rate monitor (24), however it is preferred to utilize a separate monitor with a relatively large change in output signal to the controller for a given change in flow volume. The pressure controller means is comprised of senior controller aspect (30) maintaining on/off control of higher volume line flow via connector (34) through a senior control valve (36) located in the higher volume line. The differential pressure controller means also comprises a junior controller aspect (32) maintaining proportional control of higher and lower volume line flow via connector (38) through a junior control valve (40) located in the higher volume line at a bypass point (42) comprised of bypass line (52) down stream of the line specific flow meter and up stream of the senior control valve. The differential pressure controller means is also in readable connection with the higher volume line via connector (44) to pressure coupling (46). Meter flow exits through outlet (48).

Figure 1A:
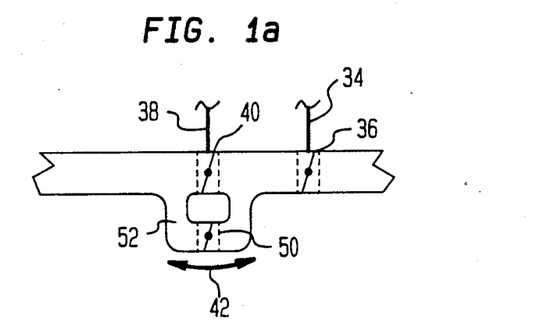
FIG. 1a is a detail of the general schematic diagram of FIG. 1 modified to include a bypass line valve.

FIG. 1a shows a detail of the extended range flow meter of FIG. 1 additionally having a bypass line valve (50) in bypass line (52).

Figure 2:
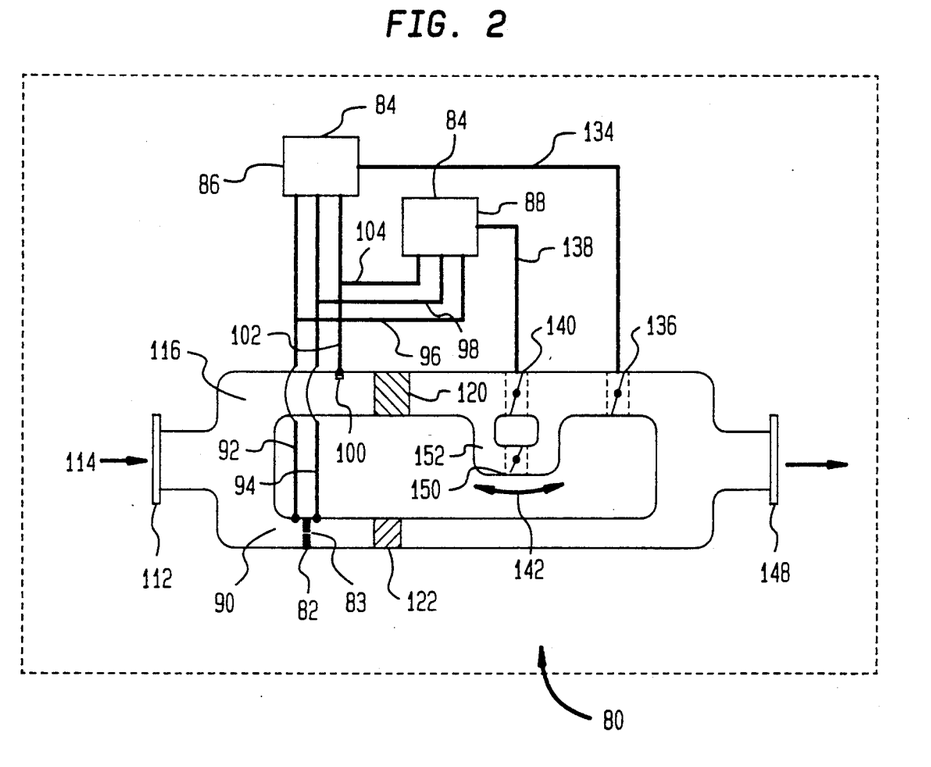
FIG. 2 is a schematic diagram of an extended range flow meter wherein the flow rate monitor is an orifice meter and the differential pressure controller means is pneumatic said differential pressure controller means being depicted as separately housed senior and junior controller aspects.

FIG. 2 shows a schematic diagram of the extended range flow meter (80) wherein the flow rate monitor in the lower volume line (90) is an orifice meter (82) having an orifice (83) therein and the differential pressure controller mean (84) is pneumatic and depicted as separately housed senior (86) and junior (88) controller aspects. Useful controllers for senior controller (86) is the Barton Process Instruments & Controls (City of Industry, Calif.) Model No. 359 and for junior controller (88) the Barton Model No. 335A. The operation of such controllers is more fully explained as to Model 359 in Barton Technical Manual No. 402-1 (1982), and as to 335A, in Barton Technical Manual No. 87K2 (1987), the teachings of which are incorporated herein by reference.

The senior controller aspect is in readable connection with orifice meter (82) via pneumatic connector tube (92) up stream of the orifice within the orifice meter and connector tube (94) down stream of the orifice within the orifice meter. The junior controller aspect is similarly in readable connection with orifice meter (82) through connector tube (96) branching off of connector tube (92) and through connector tube (98) branching off of connector tube (94). In addition the senior and junior controller aspects are in readable connection with pressure coupling (100) to higher volume line (116), the senior controller aspect via connector (102) and the junior controller via connector (104) branching off of connector (102). Also depicted are meter inlet (112) for receiving a main flow (114). From the meter inlet is a higher volume line (116) and a lower volume line (90). As depicted the lower volume line is of lesser capacity than the main flow from which it receives fluid. The higher volume line has a line specific flow meter (120). Similarly, the lower volume line has a line specific flow meter (122). The senior controller aspect of the differential pressure controller means maintains on/off control of higher volume line flow via connector (134) through a senior control valve (136) located in the higher volume line. The junior controller aspect (88) maintains proportional control of higher and lower volume line flow via connector (138) through a junior control valve (140) located in the higher volume line at a bypass point (142) comprised of bypass line (152) and bypass valve (150) down stream of the line specific flow meter and up stream of the senior control valve. Meter flow exits through outlet (148).

Figure 2A:
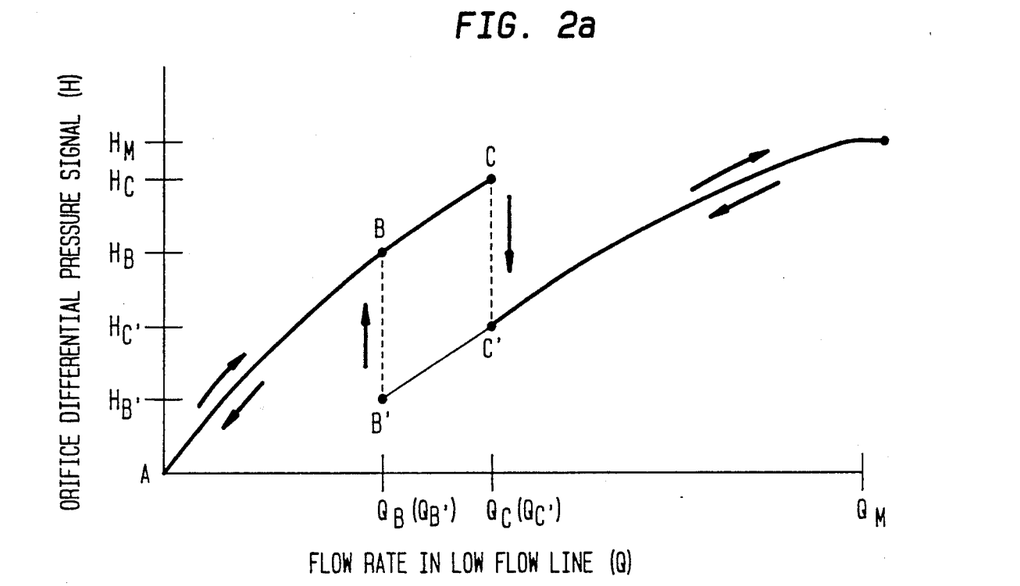
FIG. 2a is a graphic representation of the feedback control mechanism of the invention.

FIG. 2a shows a graphic representation of the control signal generated by the flow rate monitor (an orifice plate in the example) in response to the flow in the lower volume line. This figure presents the relationship between orifice meter differential pressure signal (flow rate monitor) and main (total) flow rate. The following notations are used in this figure:

$H_C$ orifice differential at which senior control valve is opened.

$H_C'$ orifice differential immediately after senior control valve is opened.

$H_B$ orifice differential immediately after senior control valve is closed.

$H_B'$ orifice differential at which senior control valve is closed.

$H_M$ maximum orifice differential (limited by the junior control valve).

$Q_C$ flow rate in lower volume line corresponding to $H_C$.

$Q'_C$ flow rate in lower volume line corresponding to $H_C'$.

$Q_B$ flow rate in lower volume line corresponding to $H_B$.

$Q'_b$ flow rate in lower volume line corresponding to $H_B^{40}$.

$Q_m$ maximum flow rate in lower volume line corresponding to $H_M$.

In the flow range A-C, the senior control valve (136) in the higher volume line is closed and all flow passes through the lower volume line. With increasing flow rate, when a flow rate of $Q_C$ is attained the corresponding orifice differential pressure signal triggers the senior control valve to fully open through action of the senior controller (86).

The flow rate $Q_C$ represents the maximum (or near maximum) flow rate for the lower volume line meter. The orifice differential pressure experiences an immediate decrease upon opening of the senior control valve since a corresponding decrease occurs in the lower volume line flow rate. Simultaneously, the junior controller (88) responds to the rapidly decreasing orifice pressure differential by closing the junior control valve (140) in order to maintain a target flow rate $Q_m$ in the lower volume line. The function of the junior control valve is to limit the lower volume line flow rate to, or below. the maximum operating flow rate for the meter in this line. Since the flow rate in the lower volume line is well below $Q_m$ upon opening of the senior control valve, the junior control valve will move to a closed position in attempting to attain $Q_m$ in the lower volume line.

The value of the orifice pressure differential after opening of the higher volume line (i.e., $H_C'$) must be controlled for two reasons. First, this pressure differential must be greater than $H_B$ (i.e. pressure differential to close senior control valve with decreasing main line flow rate) or else the senior controller will immediately reclose the senior control valve. If this were to occur, an uncontrolled open/close cycling of the senior control, valve would be initiated and the system would be inefficient. The second reason for controlling $H_C'$ to a predetermined value is to maintain a flow rate $Q_c$ above the lower optimum accuracy limit for the higher volume line meter. The specific value of $H_C'$ required for a given system is easily empirically obtained by adjusting the manual valve (150) so that the required flow rate $Q_c$ passes through the bypass line (142) upon opening of the higher volume line. This bypass line control of the higher volume line flow immediately after opening of the senior control valve is one of the most critical and the most unique features of the current metering system. It ensures that both meters maintain their optimum accuracy at the point in the flow range where both higher and lower volume line meters begin to simultaneously operate.

As the main line flow continues to increase above the value at which the higher volume line was opened, the junior control valve continually positions itself to maintain the lower-volume line flow below the maximum capacity of the meter in this line. This maximum lower volume line flow rate is shown as $Q_m$ in FIG. 2a, the corresponding orifice pressure differential shown as $H_M$. Due to this controlled flow balancing between lines (meter-adaptive flow balancing), the meters in both lines will perform within their established operating limits throughout the system operating flow rate range. The foregoing described the system operation for increasing flow rate. The same operating principles apply to decreasing flow rate except that the senior control valve will be closed (i.e., higher volume line shut off) at a slightly lower orifice pressure differential signal ($H_B'$) than exists after opening of this valve ($H_B'$ lower than $H_C''$). This is advantageous since the senior controller requires two different signals to uniquely differentiate between the valve open and valve close functions.

Figure 2B:
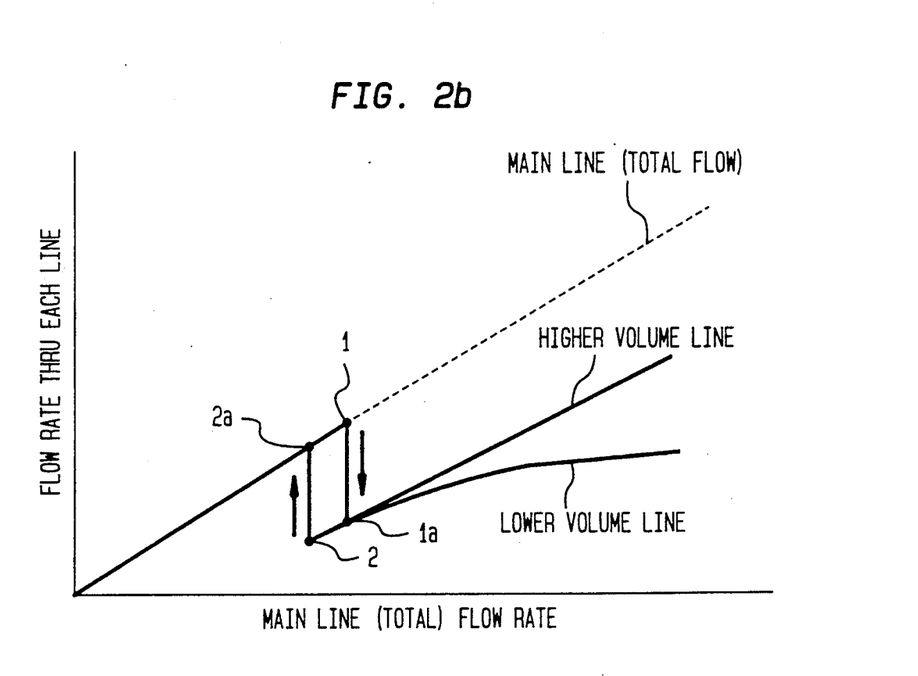
FIG. 2b is a graphic representation of flow rates in controlled lines as a function of main line flow rate.

FIG. 2b summarizes the system operation in terms of the flow rates passing through each meter during the various portions of the main line flow rate operating cycle. Flow rate in the lower and higher volume lines are shown as a function of main (total) flow rate. This flow rate graph along with the control diagram in FIG. 2a provide a complete description of the system operation as exemplified by a pneumatic differential pressure type flow rate monitor.

At flow rates below the maximum capacity of the lower volume line's line specific flow meter total flow is also lower volume line flow. Referring to point 1, opening of the senior control valve decreases lower volume line flow to point 1a at which flow in the higher volume line begins. Total flow in the system (dotted line) is seen to continue to increase. Upon opening of the senior control valve, flow rate proportions into each line immediately after opening of the senior control valve set by bypass line resistance. Resistance in the bypass line is adjustable by use of a bypass valve. The degree of opening of the junior control valve controls the proportion of flow between higher and lower volume lines. Point 2 is the point at which, in decreasing total flow the senior control valve closes. Flow in the lower volume line then immediately rises to point 2a which represents total flow for the system at that point.

If an electrical, hydraulic, or other type flow rate monitoring system is utilized, these monitoring systems can be substituted for the pneumatic systems. The differences will be in the sensors used to determine flow rate in the lower volume line and in the means used to actuate the control valve as outlined, all of which are known to these skilled in the art.

Figure 3:
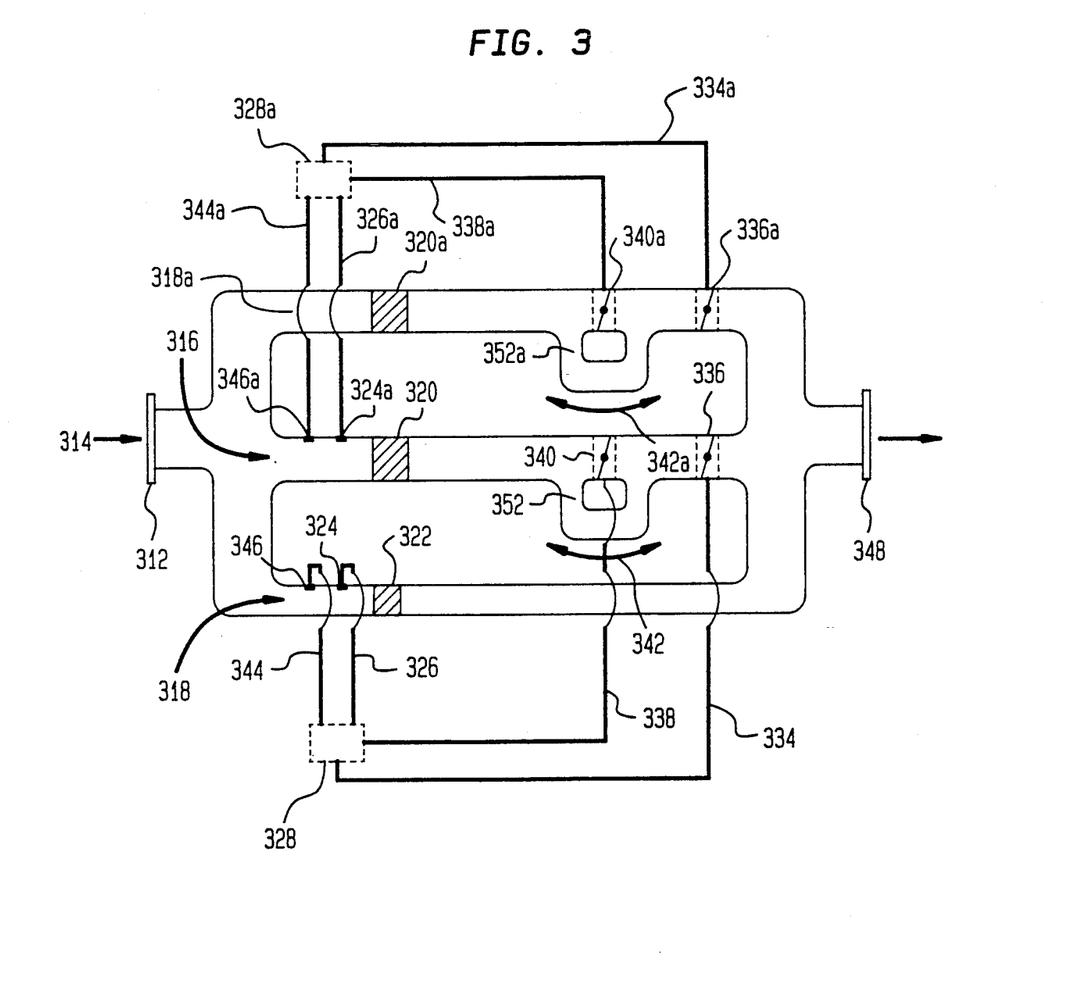
FIG. 3 is a schematic diagram of a meter configured for multiple (three or more) control lines.

FIG. 3 is a schematic diagram of a meter configured for combining multiple inlets. FIG. 3. shows an extended range flow meter with a meter inlet (312) for receiving a main flow (314). From the meter inlet is a lower volume line (316) and a lowest volume line (318) and a highest volume line (318a). As depicted the lowest volume line is of lesser capacity than the main flow from which it receives fluid. Each line has a line specific flow meter; the lower volume line (316) has line specific flow meter (320), the lowest volume line has line specific flow meter (322), and highest volume line (318a) has a line specific flow meter (320a). The lowest volume line (318) has a flow rate monitor (324) in readable connection via sensor line (326) with a differential pressure controller means (328). The pressure controller means is as described in a two flow line system as in FIG. 1. maintaining on/off control of lower volume line flow via connector (334) through a senior control valve (336) located in the lower volume line. The differential pressure controller means (328) maintains proportional control of lower volume line flow via connector (338) through a junior control valve (340) located in the lower volume line at a bypass point (342) comprised of bypass line (352) down stream of the line specific flow meter and up stream of the senior control valve. The differential pressure controller means is also in readable connection with the lowest volume line via connector (344) to pressure coupling (346). The lower volume line has a flow rate monitor (324a) in readable connection via sensor line (326a) with a differential pressure controller means (328a). The differential pressure controller means (328a) maintaining on/off control of the highest volume line through via connector (334a) to senior control valve (336a). The differential pressure controller means (328a) also maintains proportional control of highest volume line flow via connector (338a) through a junior control valve (340a) located in the highest volume line at a bypass point (342a) comprised of bypass line (352a) down stream of the line specific flow meter and up stream of the senior control valve. The differential pressure controller means is also in readable connection with the highest volume line via connector (344a) to pressure coupling (346a). Meter flow exits through outlet (348).

We claim:

1. An extended range flow meter comprising:
    (a) a meter inlet for receiving a main flow said inlet being divided into
    (b) a higher volume line and a lower volume line the lower volume line being smaller than the main flow; and the higher volume line containing therein
    (c) a line specific flow meter; and, the lower volume line containing therein
    (d) a line specific flow meter and further the lower volume line having
    (e) a flow rate monitor in readable connection with a differential pressure controller means said pressure controller means having
    (f) a senior controller aspect maintaining on/off control of higher volume line flow through a senior control valve located in the higher volume line, and
    (g) a junior controller aspect maintaining proportional control of higher and lower volume line flow through a junior control valve located in the higher volume line at a bypass point, and said point comprising a bypass line, down stream of the higher volume line specific flow meter and up stream of the senior control valve;
    (h) wherein said junior and senior controller aspects are designed and configured for meter-adaptive flow balance.

2. The extended range flow meter of claim 1 wherein the meter adaptive flow balance design and configuration (h) further comprises:
    means for control of higher volume line flow through the bypass line such that flow rate in the bypass line when the senior control valve is opened ($Q_c'$) is equal to or greater than the minimum accuracy limit for the higher volume line specific meter.

3. The extended flow range meter of claim 1 wherein the flow rate monitor is an orifice meter.

4. The extended flow range meter of claim 1 further comprising a bypass line control valve located at the bypass point within the bypass line, said bypass line exiting the higher volume line up stream of the junior control valve and re entering the higher volume line down stream of the junior control valve and upstream of the senior control valve.

5. The extended flow range meter of claim 1 wherein the controller means is pneumatic, hydraulic, electronic or mechanical.

6. The extended flow range meter of claim 5 wherein the controller means is pneumatic.

7. The extended flow range meter of claim 6 wherein the flow rate monitor is an orifice meter.

8. The extended flow range meter of claim 7 wherein the meter adaptive flow balance design and configuration (h) further comprises:

means for control of higher volume line flow through the bypass line such that flow rate in the bypass line when the senior control valve is opened ($Q_c'$) is equal to or greater than the minimum accuracy limit for the higher volume line specific meter.

9. The extended flow range meter of claim 8 further comprising means for closing the junior control valve upon opening of the senior control valve maintaining lower volume line flow rate at or below a maximum flow rate in the lower volume line ($Q_m$).

10. The extended flow range meter of claim 7 further comprising a bypass line control valve located at the bypass point within the bypass line.

11. An extended range flow meter comprising:

(a) a meter inlet for receiving a main flow said inlet being divided into:

(b) a highest volume line and one or more sequentially lower volume lines and a least volume line the sequentially lower volume lines and the least volume line each smaller than the main flow; and each of the highest volume line, the sequentially lower volume lines and the lowest volume line containing therein (c) a line specific flow meter; and further, the sequentially lower volume lines and lowest volume line each having (d) a flow rate monitor in readable connection with a differential pressure controller means said differential pressure controller means being (e) a senior controller aspect maintaining sequential on/off control of line flow through sequential senior control valves located in the higher volume line and each lower volume line, and (f) sequentially junior controller aspects maintaining proportional control of highest and sequentially lower volume and lowest volume line flow through junior control valves located in the higher volume line and each sequentially lower volume line as to each such line at a bypass point down stream of each line specific flow meter and up stream of each senior control valve;

(g) wherein said junior and senior controller aspects are designed and configured for meter-adaptive flow balance.

12. A method of extended range flow meter comprising:

I. providing an apparatus comprising:

(a) a meter inlet for receiving a main flow said inlet being divided into (b) a higher volume line and a lower volume line the lower volume line being smaller than the main flow; and the higher volume line containing therein (c) a line specific flow meter; and, the lower volume line containing therein (d) a line specific flow meter and further the lower volume line having (e) a flow rate monitor in readable connection with a pneumatic differential pressure controller means said pressure controller means having (f) a senior controller aspect maintaining on/off control of higher volume line flow through a senior control valve located in the higher volume line, and (g) a junior controller aspect maintaining proportional control of higher and lower volume line flow through a junior control valve located in the higher volume line at a bypass point, and said point comprising a bypass line, down stream of the higher volume line specific flow meter and up stream of the senior control valve; and, II. balancing fluid flow through said apparatus in meter-adaptive flow.

13. The method of claim 12 wherein the meter adaptive flow balance design and configuration further comprises:

means for control of higher volume line flow through the bypass line such that flow rate in the bypass line when the senior control valve is opened ($Q_c'$) is equal to or greater than the minimum accuracy limit for the higher volume line specific meter.

14. The method of claim 12 wherein the flow rate monitor is an orifice meter.

15. The method of claim 12 further comprising an apparatus having a bypass line control valve located at the bypass point within the bypass line. said bypass line exiting the higher volume line up stream of the junior control valve and re-entering the higher volume line down stream of the junior control valve and up stream of the senior control valve.

16. The method of claim 12 wherein the flow rate monitor is an orifice meter.

17. The method of claim 13 further comprising means for closing the junior control valve upon opening of the senior control valve maintaining lower volume line flow rate at or below a maximum flow rate in the lower volume line ($Q_m$).

18. A method of extended range flow meter comprising:

I. providing an apparatus comprising:

(a) a meter inlet for receiving a main flow said inlet being divided into:

(b) a higher volume line and one or more sequentially lower volume lines and a least volume line the sequentially lower volume lines and the least volume line each smaller than the main flow; and each of the highest volume line, the sequentially lower volume lines and the lowest volume line containing therein (c) a line specific flow meter; and further, the sequentially lower volume lines and lower volume line each having (d) a flow rate monitor in readable connection with a pneumatic differential pressure controller means said differential pressure controller means being (e) a senior controller aspect maintaining sequential on/off control of line flow through sequential senior control valve located in the higher volume line and each lower volume line, and (f) sequentially junior controller aspects maintaining proportional control of highest and sequentially lower volume and lowest volume line flow through junior control valves located in the higher volume line and each sequentially lower volume line as to each such line at a bypass point down stream of each line specific flow meter and up stream of each senior control valve;

(g) wherein said junior and senior control aspects are designed and configured for meter-adaptive flow balance; and, II. balancing fluid flow through said apparatus in meter-adaptive flow.

19. A method of extended range metering comprising meter-adaptive flow balancing flow metering comprising:
(a) introducing a fluid flow into a meter inlet for receiving a main flow;
(b) dividing said fluid flow exiting said meter inlet into a higher volume line and a lower volume line the lower volume line being smaller than the main flow; and
(c) metering the fluid flow in the higher volume line; and,
(c) metering the fluid flow in the lower volume line; and,
(e) determining flow rate in the lower volume line, and responsive to said flow rate;
(f) controlling a pneumatic differential pressure controller means, said controlling being by;
(g) maintaining on/off control of higher volume line flow through a senior control valve located in the higher volume line; and,
(h) maintaining proportional control of higher and lower volume line flow through a junior control valve located in the higher volume line at a bypass point, and said point comprising a bypass line, down stream of the higher volume line specific flow meter and up stream of the senior control valve; and,
(i) venting said introduced fluid flow through an outlet.

20. The method of claim 19 wherein the meter adaptive flow balance design and configuration further comprise:
controlling line flow of the higher volume line through the bypass line such that flow rate in the bypass line when the senior control valve is open ($Q_c'$) is equal to or greater than the minimum accuracy limit for the higher volume line specific meter.

21. The method of claim 19 wherein flow rate monitoring is by providing an orifice meter.

22. The method of claim 19 further comprising providing a bypass line control valve located at the bypass point within the bypass line, and throttling fluid flow through the bypass line wherein said flow exiting the higher volume line up stream of the junior control valve and re-entering the higher volume line down stream of the junior control valve and up stream of the senior control valve.

23. The method of claim 20 further comprising
means for closing the junior control valve upon opening of the senior control valve maintaining lower volume line flow rate at or below a maximum flow rate in the lower volume line ($Q_m$).

24. The method of claim 19 further comprising providing a the flow rate monitor which is an orifice meter.

25. A method of extending range flow metering comprising the step of meter-adaptive flow balancing of fluid flow through an apparatus comprising:
(a) introducing a fluid flow into a meter inlet for receiving main flow;
(b) dividing said fluid flow exiting said meter inlet into highest volume line and one or more sequentially lower volume lines and a least volume line the sequentially lower volume lines and the least volume line each smaller than the main flow;
(c) providing a line specific flow meter for each such line; and,
(d) metering fluid flow through each said line each of the highest volume line, the sequentially lower volume lines and the lowest volume line;
(e) providing for the sequentially lower volume lines and lowest volume line each a flow rate monitor in readable connection with a pneumatic differential pressure controller means;
(f) controlling fluid flow in each such line by said differential pressure controller means being a senior controller aspect for maintaining sequential on/off control of line flow through sequential senior control valves located in the higher volume line and each lower volume line, and sequentially junior controller aspects for maintaining proportional control of highest and sequentially lower volume and lowest volume line flow through junior control valves located in the higher volume line and each sequentially lower volume line as to each such line at a bypass point down stream of each line specific flow meter and up stream of each senior control valve;
(g) maintaining sequentially on/off control of line flow through sequential senior control valves located in the higher volume line and each lower volume line; and,
(h) maintaining proportional control of highest and sequentially lower volume and lowest volume line flow through junior control valves located in the higher volume line and each sequentially lower volume line as to each such line at a bypass point down stream of each line specific flow meter and up stream of each senior control valve wherein said junior and senior controller aspects are designed and configured for meter-adaptive flow balance; and,
(g) venting said introduced fluid flow through an outlet.

* * * * *